Dec. 31, 1929.  K. E. LYMAN  1,741,855
AUTOMATIC TRANSMISSION
Filed July 9, 1928　　2 Sheets-Sheet 1

INVENTOR
KENNETH E. LYMAN
BY
Wilson H. Knight
ATTORNEY

Dec. 31, 1929.  K. E. LYMAN  1,741,855
AUTOMATIC TRANSMISSION
Filed July 9, 1928  2 Sheets-Sheet 2

INVENTOR
KENNETH E. LYMAN
BY
ATTORNEY

Patented Dec. 31, 1929

1,741,855

UNITED STATES PATENT OFFICE

KENNETH E. LYMAN, OF ROCKFORD, ILLINOIS, ASSIGNOR TO AUTOMATIC TRANSMISSION COMPANY, OF ROCKFORD, ILLINOIS, A CORPORATION OF ILLINOIS

AUTOMATIC TRANSMISSION

Application filed July 9, 1928. Serial No. 291,395.

The present invention relates in general to power transmissions and has particular reference to an automatic change speed mechanism for transmitting a variable drive from a driving element to a driven element.

The invention has for its principal object to provide an improved automatic change speed mechanism of novel construction arrangement and operation and one which is well suited for use in connection with motor vehicles or in any other capacity, wherein it is desirable to automatically effect a change speed ratio between driving and driven elements of a transmission.

Other objects of the invention will appear hereinafter, the novel features and combinations being set forth in the subjoined claims.

One form of the invention is presented herein for the purpose of exemplification, but it will of course be understood that the invention is susceptible of embodiment in other structurally modified forms coming equally within the scope of the appended claims.

Figure 1:
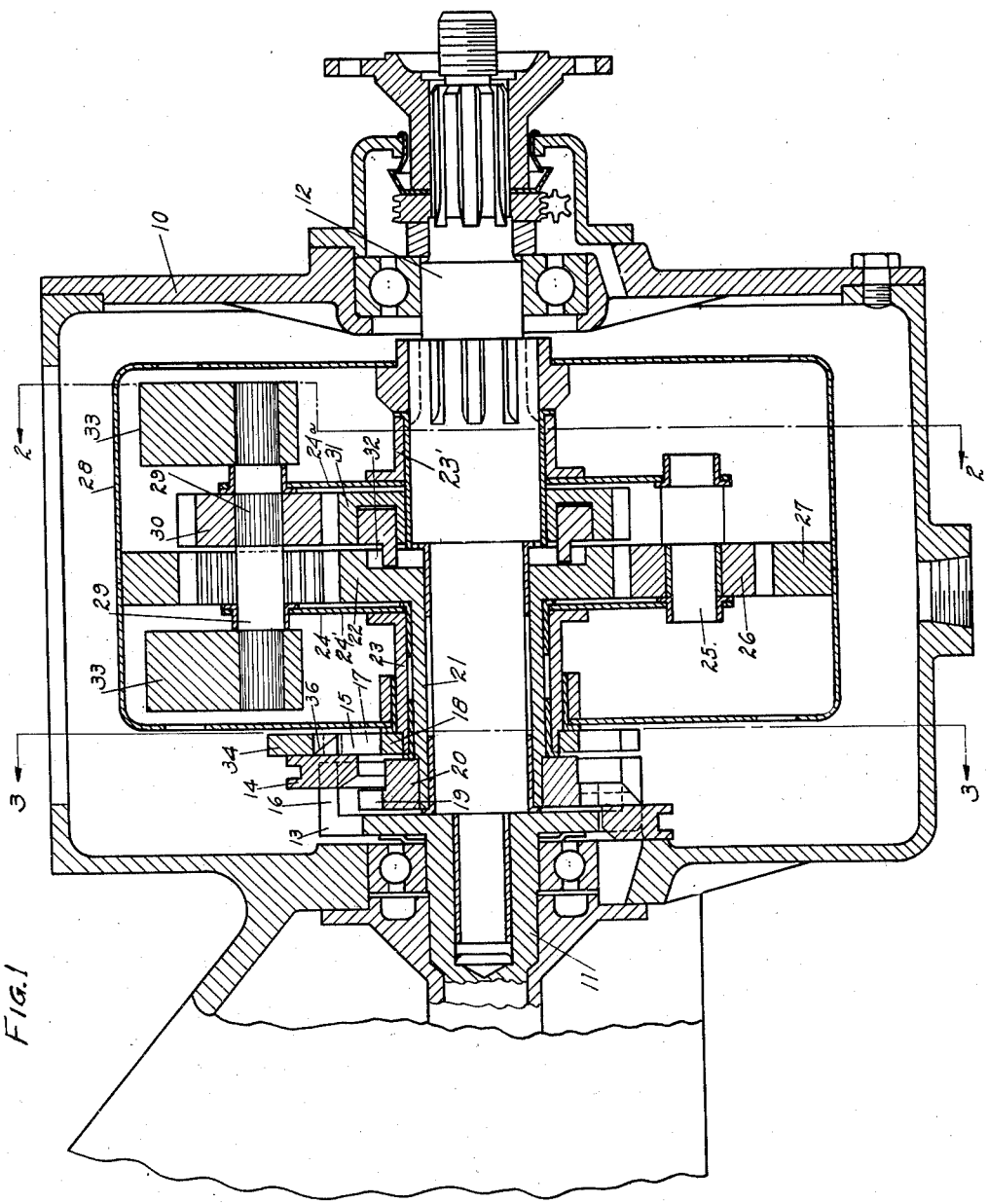
Fig. 1 is a vertical longitudinal section through a transmission constructed in accordance with the invention, taken on the line 1—1 of Fig. 2.
Figure 2:
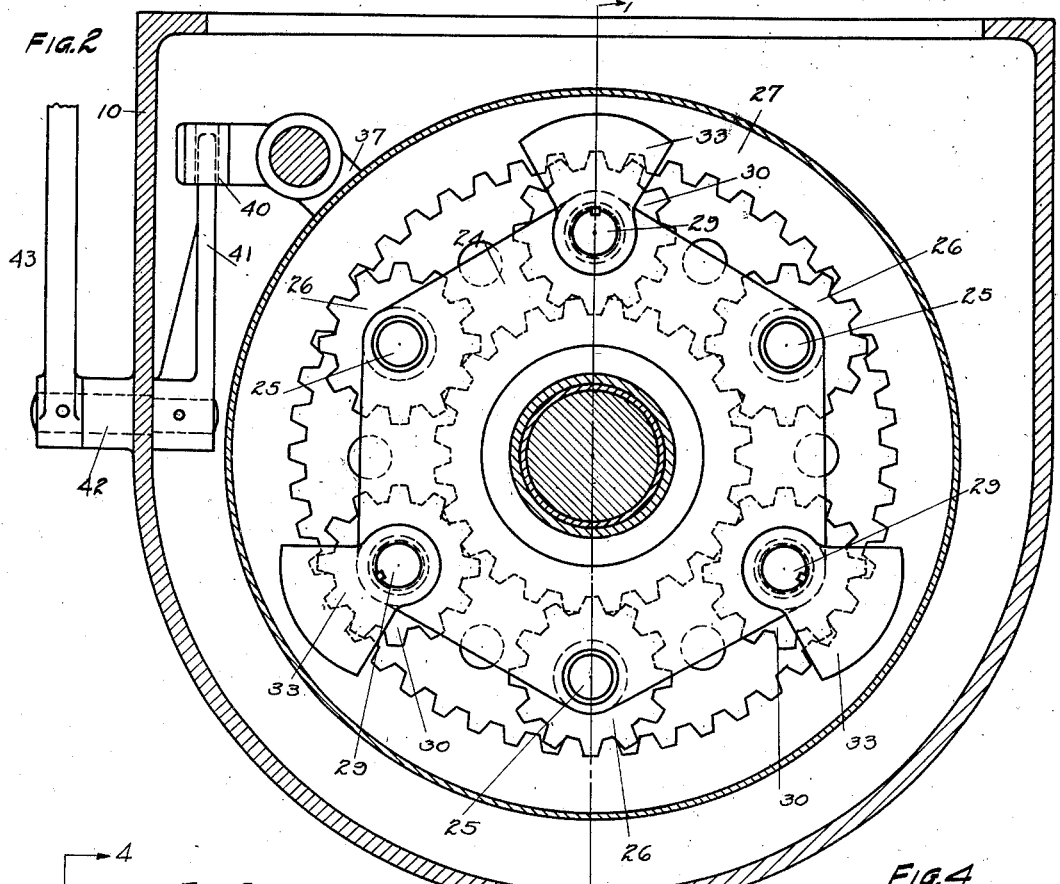
Fig. 2 is a vertical transverse section, taken on the line 2—2 of Fig. 1.
Figure 3:
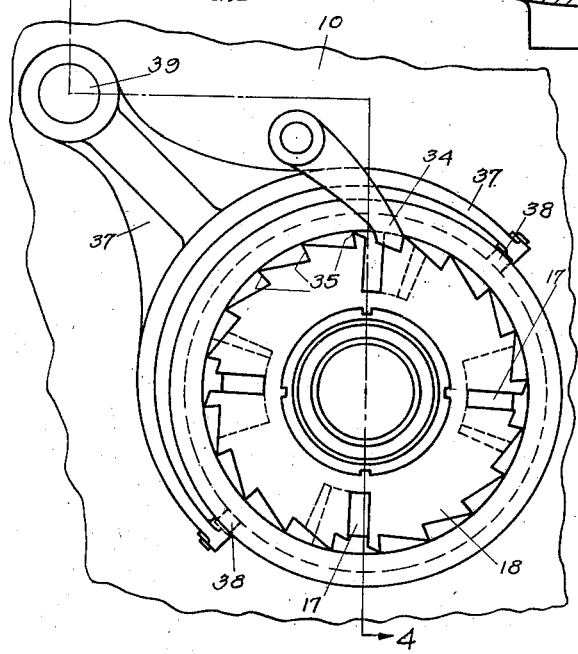
Fig. 3 is a fragmentary vertical transverse section, taken on the line 3—3 of Fig. 1.

As will be observed in the drawings, the transmission is housed within a casing 10 and includes a driving shaft 11 and a driven shaft 12. The driving shaft 11 is provided with a rearwardly cupped flange 13 which carries a circumferentially grooved collar 14. The collar 14 is shiftable axially on the flange 13, but is prevented from moving circumferentially with respect to the same by clutch lugs 15 which extend axially through and interlock with slots 16 in the flange 13.

When the collar 14 is shifted into the position shown in Fig. 1—which is the forward drive position—the lugs 15 fit into notches 17 in a clutch ring 18, and the ring 18 is in consequence locked to the driving shaft 11. When the collar 14 is shifted into the position shown in Fig. 4—which is the reverse drive position—the lugs 15 fit into notches 19 in a clutch ring 20, and the ring 20 is in consequence locked to the driving shaft 11. When the collar 14 is shifted into a position intermediate those shown in Figs. 1 and 4—which is the neutral position—the lugs 15 are not in engagement with either of the rings, and the transmission is detached from the driving shaft 11.

The clutch ring 20 is splined on the front end of a sleeve 21 which is journaled on the driven shaft 12, and a sun gear 22, which will hereinafter be referred to as the primary sun gear, is formed on the rear end of the sleeve 21. The clutch ring 18 is secured to the front end of a sleeve 23, and the front part 24' of a two-part planet gear spider 24 is secured to the rear end of the sleeve 23. The other part 24ª of the spider is secured to a sleeve 23' which is in turn journaled on the driven shaft 12.

A plurality of planet shafts 25 are carried by the spider, and a plurality of planet gears 26 are journaled on the shafts 25. The planet gears 26, which will hereinafter be referred to as the primary planet gears, mesh inwardly with the primary sun gear 22 and mesh outwardly with a ring gear 27 which is secured to a cage 28 which is in turn secured to the driven shaft 12.

A plurality of planet shafts 29 are journaled in the spider 24 intermediate the locations of the planet shafts 25, and a plurality of planet gears 30, which will hereinafter be referred to as the secondary planet gears, are secured to the planet shafts 29. The secondary planet gears 30 mesh inwardly with a sun gear 31, which will hereinafter be referred to as the secondary sun gear, and the secondary sun gear 31 is journaled on the driven shaft 12 and is provided with a one-way clutch mechanism 32 of any suitable description. The clutch mechanism 32 coacts with the primary sun gear 22 and is so arranged as to permit the secondary sun gear to advance relative to the primary sun gear, while preventing the primary sun gear from advancing with respect to the secondary sun gear, all for a purpose hereinafter explained.

The planets 29 which carry the secondary planet gears 30 also carry weights 33, which weights are secured eccentrically to the ends of the shafts.

When the collar 14 is shifted into the forward drive position shown in Fig. 1 and the driving shaft 11 is rotated, the spider 24 will be correspondingly rotated, causing the primary sun gear 22 to be rotated in the same direction as the spider but at a much greater speed, it being assumed of course that the ring gear 27, which is secured rigidly to the driven shaft 12, is stationary or nearly so. The clutch mechanism 32 positioned between the primary sun gear 22 and the secondary sun gear 31 will cause the gear 31 to rotate as fast as the gear 22, and the resulting rotation of the gear 31 will cause the secondary planet gears 30 to be rotated.

As the secondary planet gears 30 rotate, centrifugal and inertia forces act upon the weights 33 whereby to retard inward movement of the weights and accelerate outward movement of the same. The weights 33, when moving inwardly, act through the gears 30, 31 and 22 to slow up the planetary movement between the gears 22 and 26, and such slowing up of the planetary movement reacts to rotate the ring gear 27, together with the driven shaft 12, in a forward direction.

The weights 33, when moving outwardly, would serve to accelerate the planetary movement but for the action of the clutch mechanism 32. As the weights 33 move outwardly, the secondary sun gear 31 is momentarily accelerated, but such acceleration is not transmitted to the primary sun gear 22 because the clutch mechanism 32 permits the gear 31 to advance freely with respect to the gear 22. Because of this arrangement, the centrifugal force resisting the inward movement of the weights 33 acts to cut down the planetary movement and pick up the ring gear, while the centrifugal force acting to accelerate the outward movement of the weights is entirely neutralized.

When the resistance offered by the weights becomes sufficiently great, by reason of the increased speed of the driving shaft 11, the planetary movement in the transmission will be gradually eliminated, and the transmission will operate in a one-to-one drive.

Figure 4:
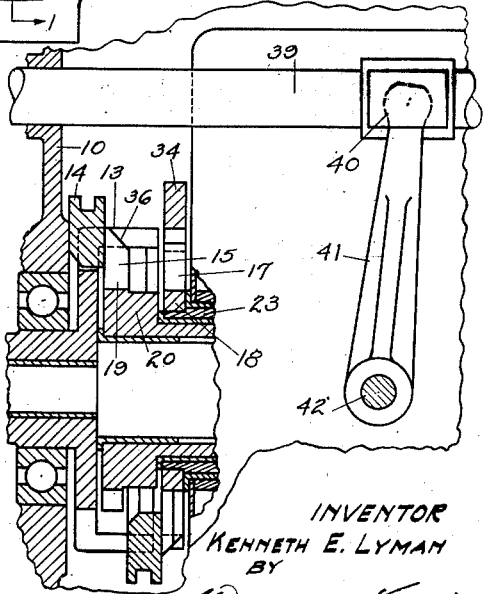
Fig. 4 is a fragmentary vertical longitudinal section, taken on the line 4—4 of Fig. 3.

In order to place the transmission in reverse, the collar 14 is shifted into the position shown in Fig. 4, in which position the driving shaft 11 is disconnected from the clutch ring 18 and is locked rigidly to the clutch ring 20. A pawl 34 is pivoted to the casing 10 above the clutch ring 18, and engages with the ratchet teeth 35 in the periphery of the same, whereby to prevent the clutch ring 18 and the spider 24 connected with the same from rotating in a forward direction. The pawl 34 is held out of engagement with the clutch ring 18 when the collar 14 is in the direct drive position by an inclined cam surface 36 on the collar 14 which rides under and lifts the pawl. When the primary sun gear 22 is driven by the driving shaft 11 and the spider 24 is held against forward rotation, which is the reverse drive position of those parts, the ring gear 27 will be rotated slowly in a reverse direction, and the driven shaft 12, which is connected with the ring gear 27, will be correspondingly rotated.

The collar 14 is shifted manually by a fork 37 which is provided at opposite sides of the collar 14 with pins 38 which fit into the groove in the collar. The fork 37 is slidably mounted on a shaft 39, and is provided with a socket 40 into which the upper end of a lever 41 loosely fits. The lever 41 is pivoted to a pin 42, and the pin 42 carries, exteriorly of the casing 11, another lever 43. When the lever 43 is oscillated, the lever 41 is correspondingly oscillated, and the fork 37, together with the collar 14, is shifted into the position desired.

Having thus described and shown an embodiment of my invention, what I claim and desire to secure by Letters Patent of the United States is:

1. In an automatic transmission, a driving shaft, a driven shaft, a planet gear spider, means for connecting said spider with said driving shaft, a ring gear, means for connecting said ring gear with said driven shaft, a primary sun gear, primary planet gears journaled in said spider in mesh with said ring gear and said primary sun gear, a secondary sun gear, a one-way clutch connecting said primary and secondary sun gears, secondary planet gears journaled in said spider in mesh only with said secondary sun gear, and weights associated with said secondary planet gears.

2. In an automatic transmission, a driving shaft, a driven shaft, a planet gear spider, means for connecting said spider with said driving shaft, a ring gear, means for connecting said ring gear with said driven shaft, a primary sun gear, primary planet gears journaled in said spider in mesh with said ring gear and said primary sun gear, a secondary sun gear, a one-way clutch connecting said primary and secondary sun gears to cause the latter to rotate as fast as the former while allowing the latter to rotate faster than the former, secondary planet gears journaled in said spider in mesh only with said secondary sun gear, and weights associated eccentrically with said secondary planet gears.

3. In an automatic transmission, a driving shaft, a driven shaft, a planet gear spider, means for connecting said spider with said driving shaft, a ring gear, means for connecting said ring gear with said driven shaft, a primary sun gear, primary planet gears journaled in said spider in mesh with said ring gear and said primary sun gear, a secondary sun gear, a one-way clutch connecting said primary and secondary sun gears, and centrifugally-actuated means for alternately retarding and accelerating said secondary sun gear.

4. In an automatic transmission, a driving shaft, a driven shaft, a planet gear spider, a primary sun gear, means for connecting either said spider or said primary sun gear with said driving shaft, a ring gear, means for connecting said ring gear with said driven shaft, primary planet gears journaled in said spider in mesh with said ring gear and said primary sun gear, a secondary sun gear, a one-way clutch connecting said primary and secondary sun gears, secondary planet gears journaled in said spider in mesh only with said secondary sun gear, weights associated eccentrically with said secondary planet gears, and means for preventing said spider from rotating forwardly when said primary sun gear is connected with said driving shaft.

5. In a transmission, driving and driven shafts, planetary speed changing mechanism connecting said shafts, comprising a ring gear, means for connecting said ring gear with said driven shaft, a sun gear, a planet carrier, manually selectable means for connecting either said sun gear or said planet carrier with said driving shaft, motion transmitting planet gears meshing with said sun gear and said ring gear and means for automatically controlling said mechanism, comprising a secondary sun gear, a one way clutch connecting said secondary sun gear with said first named sun gear, pinions meshing with said secondary sun gear only, planet shafts on which said pinions are fixed to rotate therewith, and centrifugal weights fixed to rotate with said pinions.

6. In an automatic transmission, driving and driven shafts, planetary speed changing mechanism, a motion transmitting rotating member in said mechanism, means for automatically controlling said mechanism, a motion transmitting member in said control means, a one way clutch connecting said second named motion transmitting member with said first named motion transmitting member, gears connected in control imparting relation with said second named motion transmitting member and centrifugal weights mounted to rotate with said gears.

7. In a transmission, driving and driven shafts, planetary speed changing mechanism connecting said shafts, comprising a planet carrier, a sun gear, planet gears, and ring gear, means for connecting said ring gear with the driven shaft, means for connecting the sun gear with the driving shaft, and means for automatically controlling said mechanism, comprising a centrifugal weight and means for connecting said weight with said mechanism, comprising a gear train and a one way clutch connecting one of the gears in said train with said sun gear.

8. In a transmission, driving and driven shafts, speed changing mechanism for connecting said shafts in different speed ratios, a planetary gear system in said mechanism and means for automatically controlling said system, comprising a centrifugal weight, a gear train in which said weight is mounted and a one way clutch for connecting one element of said gear train with one element of said planetary system.

9. In a transmission, driving and driven shafts, planetary speed changing mechanism for connecting said shafts in different speed ratios, said mechanism embodying in its construction a planet carrier, a sun gear, manually selectable means for connecting either said planet carrier or said sun gear with the driving shaft, a ring gear, means for connecting said ring gear with the driven shaft, planet gears meshing with said sun and ring gears, and means for automatically controlling said mechanism, comprising a gear train, a centrifugal weight in said gear train, and a one way clutch for connecting one element of said gear train with said sun gear.

10. In a transmission, driving and driven shafts, planetary speed changing mechanism connecting said shafts, comprising a sun gear, a planet carrier, manually selectable means for connecting either said sun gear or said planet carrier with said driving shaft, a ring gear, means for connecting said ring gear with said driven shaft, planet shafts mounted on said planet carrier, planet gears on said shafts meshing with said sun gear and said ring gear, and means for automatically controlling said mechanism, comprising a second set of planet shafts mounted on said planet carrier, a second set of planet gears on said second named planet shafts and mounted fixed to rotate therewith, a secondary sun gear with which said second named planet gears are in constant mesh, a one way clutch connecting said secondary sun gear with said first named sun gear and centrifugal weights mounted in fixed relation to said second named planet shafts.

11. In a transmission, driving and driven shafts, planetary speed changing mechanism for connecting said shafts in different speed ratios, a sun gear in said mechanism and means for automatically controlling said mechanism, comprising a gear train, a centrifugal weight in said gear train, and a one way clutch for connecting one element of said gear train with said sun gear.

12. In a transmission, driving and driven shafts, speed changing mechanism for connecting said shafts in different speed ratios, primary and secondary gear trains in said mechanism, a one way clutch for connecting one of the gears in the primary gear train with a corresponding gear in the secondary gear train and a centrifugal responsive weight connected with one of the gears in said secondary train.

13. A centrifugal weight controlled planetary speed changing mechanism, comprising in combination, a plurality of gear trains, one way clutching means connecting said gear trains, planet gears in said gear trains, shafts for said planet gears, a planet carrier common to all of said planet shafts and centrifugal weights mounted on the planet shafts for one of said gear trains.

14. An automatically controlled planetary speed changing mechanism, comprising in combination, a planetary gear system, a centrifugal weight influenced gear train, and one way clutching means connecting said gear train with said planetary gear system.

15. In an automatic transmission, driving and driven shafts, planetary gearing for connecting said shafts in different speed ratios, a sun gear in said gearing, planet gears in said gearing, a carrier for said planet gears, manually operable means for selectively connecting either said sun gear or said carrier with the driving shaft, means for holding the carrier against forward rotation when the sun gear is connected to the driving shaft, a ring gear in said gearing, means for connecting said ring gear with the driven shaft, and means for changing the ratio, comprising a centrifugal weight influenced gear train and a one-way clutch connecting one element of said gear train with said sun gear.

16. In an automatic transmission, driving and driven shafts, planetary gearing for connecting said shafts in different speed ratios, a sun gear in said gearing, planet gears in said gearing, a carrier for said planet gears, manually operable means for selectively connecting either said sun gear or said carrier with the driving shaft, means for holding the carrier against forward rotation when the sun gear is connected to the driving shaft, a ring gear in said gearing, means for connecting said ring gear with the driven shaft, and means for changing the ratio, comprising a gear train, a one-way clutch connecting one element of said gear train with said sun gear, a planet gear in said gear train, a shaft for said planet gear mounted in said carrier and centrifugal weights on said shaft.

17. In a transmission, driving and driven elements, planetary gearing for connecting said elements in different speed ratios, a drive imparting planet gear in said gearing and means for automatically changing the ratio, comprising, in combination a centrifugal weight influenced gear train and means for causing said gear train to influence the rotation of said drive imparting planet gear about its own axis.

18. In an automatic transmission, driving and driven shafts, planetary change speed mechanism connecting said shafts, comprising in combination a driving spider through which forward drives are introduced into the mechanism, a ring gear through which both forward and reverse drives are imparted to the driven shaft, primary and secondary sun gears in said mechanism, one-way clutching means connecting said sun gears, primary and secondary planet gears meshing respectively with said sun gears, said primary planet gears also meshing with said ring gear, primary and secondary planet shafts for said planet gears, centrifugal weights mounted on said secondary planet shafts, said weights adapted to develop a retarding effect in the planetating movement of the primary planet gears for picking up the ring gear with gradually increasing driving power as the speed of the driving shaft and the torque of the driven shaft becomes more evenly balanced; whereby the driving and driven shafts may be automatically connected in a one to one drive.

19. In an automatic transmission, driving and driven shafts, planetary change speed mechanism connecting said shafts, comprising in combination a driving spider through which forward drives are introduced into the mechanism, a ring gear through which both forward and reverse drives are imparted to the driven shaft, primary and secondary sun gears in said mechanism, one-way clutching means connecting said sun gears, primary and secondary planet gears meshing respectively with said sun gears, said primary planet gears also meshing with said ring gear, primary and secondary planet shafts for said planet gears, centrifugal weights mounted on said secondary planet shafts, said weights adapted to develop a retarding effect in the planetating movement of the primary planet gears for picking up the ring gear with gradually increasing driving power as the speed of the driving shaft and the torque of the driven shaft becomes more evenly balanced; whereby the driving and driven shafts may be automatically connected in a one to one drive and manually operable means for reversing the drive through said mechanism including means for arresting the rotation of the spider.

20. In a transmission, driving and driven shafts, planetary change speed mechanism for connecting said shafts in different speed ratios and means for automatically changing the ratio, comprising in combination, a sun gear, planet gears meshing with said sun gear, a ring gear meshing with said planet gears, means for connecting the ring gear with the driven shaft, a planet carrier for the planet gears, means for selectively connecting either the sun gear or planet carrier with the driving shaft for forward speeds, means for holding the planet carrier for reversing speeds, a centrifugal device mounted in said mechanism and a control transmitting connection between said device and the planetating members in said mechanism.

21. In an automatic transmission, driving and driven shafts, planetary change speed mechanism for connecting said shafts in different speed ratios, comprising a plurality of planetating gear systems, means for connecting said systems in driving relation with the driving shaft, means interconnecting said systems in intermittent driving relation one with the other at forward speeds of the mechanism, means for connecting one of the systems with the driven shaft and means for automatically changing the speed ratio in said mechanism.

22. In a transmission, driving and driven elements, planetary change speed mechanism for connecting said elements in different speed ratios, a ring gear in said mechanism, a power transmitting planetating gear meshing with said ring gear, a sun gear meshing with said power transmitting planetating gear and means for automatically changing the ratio, comprising a secondary sun gear, a one-way clutch connecting said secondary sun gear with said first named sun gear and a yieldably restrained pinion meshing with said secondary sun gear.

23. In an automatic transmission, driving and driven elements, planetary change speed mechanism for connecting said elements in variable driving ratios, comprising a plurality of interconnected drive imparting and ratio changing planetating gear systems, means connecting said mechanism with a driving element and an element to be driven, means for reversing the drive between the driving element and the element to be driven, means for yieldably restraining one of said gear systems and a one-way clutch for connecting said yieldably restrained gear system with said drive imparting gear system for all forward driving speeds.

24. In a transmission, driving and driven elements, speed changing mechanism connecting said elements, a motion transmitting member in said mechanism and means responsive to the torque ratio between said driving and driven elements for imparting a substantially constant retarding effect to the effective operation of said motion transmitting member, comprising a rotating centrifugal weight and a motion transmitting connection including a releasable clutch connecting said weight with said motion transmitting member throughout certain predetermined angles of the cycle of rotation of said weight.

25. An automatically controlled speed changing mechanism, comprising in combination, driving and driven elements, a gear train for connecting said elements in automatically variable driving ratios and through which both forward and reverse drives are transmitted from the driving element to the driven element, a releasable driving connection between the driving element and one of the members in said gearing, means for releasing the driving connection with said member, arresting its rotation and connecting another member of said gearing to the driving element and means coacting with said gear train and effective only when said first named member is connected in driving relation with the driving element for changing the driving rotio between the driving and driven elements.

26. In a transmission, driving and driven elements, speed changing mechanism for connecting said elements in automatically variable driving ratios, comprising in combination, a plurality of planetary gear trains, planet shafts in said gear trains, a spider for carrying said planet shafts, means connecting said spider with the driving element for transmitting the drive between the driving element and the driven element in one direction, means for releasing said spider from driving relation with the driving element, arresting its rotation and connecting another member in the gear trains with the driving element for reversing the drive between the driving and driven elements and means coacting with one of the gear trains effective only when the driving element is connected with the spider for automatically changing the driving ratio between the driving and driven elements.

27. In a transmission, driven and driven elements, change speed mechanism for connecting said elements in automatically variable driving ratios, comprising in combination, a gear train through which both forward and reverse drives are transmitted from the driving element to the driven element, manually operable means for selectively connecting certain of the members in said gear train with the driving element and arresting the rotation of one of said members when it is not connected with the driving element for reversing the drive between the driving and driven elements and means coacting with said gear train and effective only when the drive is forward for automatically changing the drive ratio between the driving and driven elements.

28. In a transmission, driving and driven elements, speed changing mechanism for connecting said elements in automatically variable driving ratios, comprising in combination, a plurality of planetary gear trains, means for connecting one of the gear trains with the driving and driven elements for transmitting both forward and reverse drives between said elements, means for reversing the drive and means coacting with the other of said gear trains and effective only when the drive is forward for automatically changing the driving ratio between the driving and driven elements.

29. An automatically controlled planetary speed changing mechanism, comprising in combination, a planetary gear system, having an element which is mounted for rotation in one direction when a forward drive is transmitted from a driving element of the mechanism to a driven element thereof, means for holding said first named element to prevent its rotation in the direction which it rotates when the drive through the mechanism is forward, a yieldably restrained gear train mounted adjacent said planetary gear system and means intermittently effective, when the drive is forward, for connecting said gear train in driving relation with said planetary gear system.

In testimony whereof I have hereunto subscribed my name.

KENNETH E. LYMAN.